March 7, 1967 K. V. KORDESCH 3,307,977
HYDROGEN ANODE INCLUDING ALUMINUM SPINEL
AND PLATINUM FAMILY COATINGS AND
METHOD OF MAKING SAME
Filed July 30, 1962
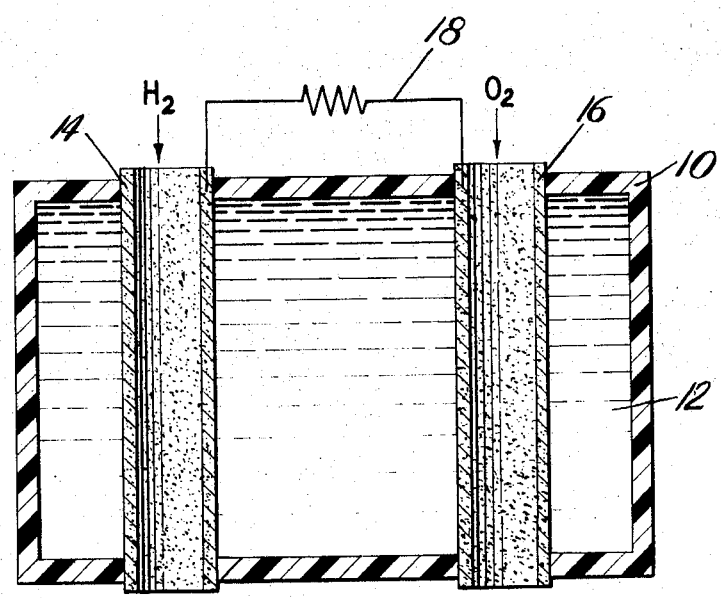
INVENTOR.
KARL V. KORDESCH
BY
ATTORNEY United States Patent Office 3,307,977
Patented Mar. 7, 1967

3,307,977
HYDROGEN ANODE INCLUDING ALUMINUM SPINEL AND PLATINUM FAMILY COATINGS AND METHOD OF MAKING SAME
Karl V. Kordesch, Lakewood, Ohio, assignor to Union Carbide Corporation, a corporation of New York
Filed July 30, 1962, Ser. No. 213,246
6 Claims. (Cl. 136—122)

This application is a continuation-in-part of applications Serial No. 764,342 and Serial No. 764,359, both filed September 30, 1958 and both now abandoned.

The invention concerns a hydrogen anode for a hydrogen-oxidant fuel cell, and particularly refers to a novel combination of catalysts therefor.

A fuel cell may be considered as a primary galvanic cell, the basic reaction of which is the electro-chemical oxidation of a fuel, such as hydrogen gas. Although such cells have been known for over a century, many scientists are still actively engaged in finding new ways to boost the electrical output of these cells in order to render them commercially feasible.

One such area of research involves catalysis of the reactions. New methods of depositing known catalysts in a more active form are being developed, and new catalysts for the reactions are being discovered. There is still a need, however, for catalysts which will raise either the current density, the voltage, or both to approach the theoretically possible energy available from the reaction.

It is, therefore, the primary object of the invention to provide an improved hydrogen anode for a hydrogen-oxidant fuel cell.

It is another object of the invention to provide a method for catalyzing a hydrogen anode for a hydrogen-oxidant fuel cell.

A cross-sectional view of a fuel cell embodying the invention is shown in the sole figure of the drawing.

Broadly, the above objects are achieved by a hydrogen anode construction comprising a gas-permeable, electrolyte-repellent body and on the active surface of said body a metal catalyst for promoting hydrogen dissociation, said catalyst comprising in combination the pyrolysis product of a heat-decomposable metallic salt and an aluminum salt and at least one metal catalyst of the platinum family metals. The pyrolysis product of a heat-decomposable metallic salt and aluminum salt will be referred to hereinafter as a spinel, since it has the crystal structure of a spinel or at least a close relative of the structure.

The spinel may be deposited on the anode body by the processes described and claimed in patents to A. Marko and K. Kordesch, U.S. 2,615,932 and 2,669,598 which issued on October 28, 1952, and February 16, 1954, respectively. Briefly, the process comprises impregnating a gas-permeable body, preferably made of an activated carbon, with a solution of at least one heat-decomposable salt of a heavy metal selected from the group consisting of iron, cobalt, nickel, manganese, chromium, copper, silver, gold, vanadium, titanium, uranium, thorium, and the rare earths, and at least one heat-decomposable salt of aluminum, and then heating the impregnated body to a temperature at which the salts decompose to form a catalyst. The spinels are insoluble in caustic electrolytes, and are at least partially conductive, which helps to minimize the resistance of an electrode as compared with other materials which are non-conductive.

In general, approximately stoichiometric amounts of the above salts are preferred so that a true spinel structure in the pyrolysis product is formed. The type of salt which is employed is not critical, but it should be one which decomposes without too much difficulty, and which possesses oxidizing properties. Nitrates and nitrites, i.e., the salts of nitric or nitrous acids, are preferred. Other salts which may be employed include those of chloric acid, chromic acid, oxalic acid, acetic acid, and formic acid. The temperature at which the spinels are formed is, in general, at least about 700° C., and usually lies between about 700° C. and 950° C. It has also been found that a spinel catalyst made from cobalt and aluminum salts provides the best catalytic action with respect to fuel cell reactions, especially since this catalyst is relatively insoluble in caustic electrolytes. Preferably, the spinels are deposited from a 0.1 molar solution.

The other part of the combination catalyst disclosed herein comprises a metal catalyst selected from the platinum family of metals. This metal catalyst is deposited on the electrode body by coating a salt of the platinum family metal on the body and then heating, preferably in a non-oxidizing atmosphere, to decompose the salt and deposit the metal catalyst in an active form. The exact state of the metal catalyst is not known, but it probably exists as either a pure metal, a suboxide, or a constituent of a complex catalyst consisting of it and the spinel. It was found, however, that the activity of the combination catalyst was reduced substantially if the metal catalyst was deposited at temperatures higher than 200° C. In this regard, the presence of the spinel is advantageous since it helps to promote the decomposition of the salt of the metal catalyst at temperatures below 200° C. Ordinarily, the salt must be heated to over 300° C. for proper decomposition in the absence of promoters, and such high temperatures tend to cause undesirable sintering and deactivation of the metal catalyst.

Of the platinum family metals, i.e., platinum palladium, iridium, ruthenium, osmium, and rhodium, the element rhodium has the distinct advantage of not being poisoned by sulfur compounds of by cyanides, which are oftentimes introduced into the electrode body during manufacture.

The particular salt of these metals for use in the impregnation step is not critical, but it must be capable of decomposition below about 200° C. to form the metal catalyst. Chloroplatinic acid and rhodium trichloride are examples of suitable salts.

The concentration of the spinel catalyst is preferably within about 0.05 and about 0.2 weight percent spinel based on the weight of the electrode material, such as carbon, and the concentration of metal catalyst is preferably within about ¼ and 8 milligrams of metal catalyst per apparent square centimeter of surface area. Concentrations of about 0.1 weight percent spinel and about 2 mg./cm.$^2$ of metal catalyst are found to be the most active.

With reference to the drawing, the fuel cell there shown comprises a container 10 having therein an electrolyte 12 suitably composed of a 12 to 15 M solution of potassium hydroxide. In the container 10 and in contact with the electrolyte 12 are a hydrogen anode 14 and an oxygen cathode 16, both suitably made of activated carbon which, as used herein, means carbon having a large surface area. An external circuit 18 electrically connects the anode 14 to the cathode 16.

As shown in the drawing, hydrogen gas is circulated through the anode 14 and oxygen gas through the cathode 16.

The anode 14 and cathode 16 can be made and catalyzed by the following process:

Carbon shells are suitably made of 100 parts finely divided carbon black, 63 parts soft pitch, and 3 parts fuel oil, and the shells are then baked at 1000° C. for about 6 hours. The raw tubes have a porosity of about 18 to 20 percent (measured by water saturation). Porosity is then increased to about 25 percent by heating to a temperature of about 850° C. to 950° C. in a $CO_2$ or steam atmosphere for several hours. Carbon plates (¼ inch thick) are usually made from a similar mix, and subsequently molded into shape, baked, and activated as described herein.

Next, the spinel catalyst solution, which is preferably a 0.1 molar solution of cobaltous nitrate $$[Co(NO_3)_2 \cdot 6H_2O]$$

and aluminum nitrate $[Al(NO_3)_3 \cdot 9H_2O]$, is applied to the electrodes and decomposed by heat to form the pyrolysis product, which is probably a true spinel, $$CoO \cdot Al_2O_3$$

on the carbon surfaces. The decomposition is preferably conducted in an oxidizing atmosphere, such as carbon dioxide, and at a temperature between about 850° C. and 950° C. The nitrogen oxides produced during the nitrate decomposition oxidize the electrodes and thereby increase the porosity of the electrodes to a 30 to 35 percent range, which is the range most desirable for fuel cell use. At this point, the carbon tubes contain catalysts suitable for promoting oxygen dissociation.

A 10 percent aqueous solution of chloroplatinic acid $(H_2PtCl_6 \cdot 6H_2O)$ or rhodium trichloride $(RhCl_3)$ is then painted on the carbon tubes for hydrogen anodes, and then thermally decomposed to the corresponding metal catalyst at a temperature approaching 200° C. Ten millimeters of such a solution are necessary to produce a (calculated) surface coverage of 2 mg. of metal per $cm.^2$ on a 12-inch electrode. The decomposition is usually performed in air, but a reducing (hydrogen) atmosphere may be advantageous if the electrode material tends to oxidize at temperatures under 200° C.

The carbon tubes for both anodes and cathodes are then treated to increase their repellency to electrolyte. This treatment consists of: (1) electrode immersion in a solution of 1½ percent by weight paraffin in petroleum ether followed by air drying, and (2) the application of kerosene (B.P. 200° C. to 250° C.) to the inner tubular surfaces of the electrodes. Kerosene should not be applied to the outer (active) electrode surfaces, since high polarization may result.

The electrodes are now ready for use in fuel cells. The following data indicate the effectiveness of a hydrogen anode having the combination catalyst of the invention as compared with a hydrogen anode having only a metal catalyst.

TABLE I.—POLARIZATION VOLTAGE DROP OF CATALYST OF INVENTION AND SIMPLE PLATINUM METAL CATALYST

| Electrode Treatment | Electrolyte | Polarization Voltage Drop at current density indicated compared with open circuit voltage of a standard hydrogen electrode. | | |
| --- | --- | --- | --- | --- |
| | | 50 a./ft.² | 100 a./ft.² | 200 a./ft.² |
| A. Hydrogen-carbon plate electrode; Rh-Pd catalyst formed at 300° C. without previous spinel treatment. | 12N KOH | −100 mv | −150 mv | −200 mv. |
| B. Hydrogen-carbon plate electrode, Rh-Pd catalyst formed at 180° C. with spinel treatment in accordance with invention. | 12N KOH | −25 mv | −50 mv | −75 mv. |

The above data indicates the marked superiority in terms of considerably decreased electrodepolarization of the combination catalyst over the platinum family metal catalyst alone. A spinel-catalyzed electrode will not function as a hydrogen electrode without the platinum family catalyst present. In addition, the combination catalyst provides an increase in electrode reliability, a reduction in activation time, and an increased and more uniform electrode active surface area. The combination catalyst also provides a decrease in the temperature of activation by as much as 200° C.

The above effect has also been obtained in tests of a combination of spinel and platinum as the catalyst. Such a combination is especially useful since it can be used in both a basic environment and an acidic environment, such as the hydrochloric acid environment in hydrogen-chlorine fuel cells.

What is claimed is:

1. A method for catalyzing a hydrogen anode, which method comprises providing a gas-permeable body composed of activated carbon, coating a solution of a heavy metal salt and an aluminum salt on a surface of said body, said heavy metal being at least one of the elements iron, cobalt, nickel, manganese, chromium, copper, silver, gold, vanadium, titanium, uranium, thorium and the rare earths, heating said coated body at a temperature of at least about 700° C. to decompose said heavy metal salt and said aluminum salt and thereby form a spinel on said surface, coating a second solution of a salt of a platinum family metal on said surface, and heating said coated body to a temperature up to 200° C. and at which said salt of said platinum family metal decomposes, thereby forming a metal catalyst on said surface in combination with said spinel.

2. The method defined in claim 1 wherein said heavy metal salt is a cobalt salt.

3. The method defined in claim 1 wherein said heavy metal salt is cobalt nitrate and said aluminum salt is aluminum nitrate.

4. The method defined in claim 1 wherein said heavy metal salt is cobalt nitrate, said aluminum salt is aluminum nitrate and said platinum family metal is a mixture of rhodium and palladium.

5. Hydrogen anodes produced by the process of claim 1.

6. Hydrogen anodes produced by the process of claim 4.

(References on following page)

References Cited by the Examiner

UNITED STATES PATENTS

| | | | |
|---|---|---|---|
| 2,615,932 | 10/1952 | Marko et al. | 136—122 |
| 2,949,387 | 8/1960 | Colbert et al. | 117—217 X |
| 3,116,170 | 12/1963 | Williams et al. | 136—86 |
| 3,126,302 | 3/1964 | Drushella | 136—86 |

OTHER REFERENCES

First Practical Fuel Cell. In Chem. Engr. vol. 64, No. 12, pp. 154, 156, 158, December 1957.

WINSTON A. DOUGLAS, *Primary Examiner.*

ALLEN B. CURTIS, *Examiner.*